US012810134B2

(12) United States Patent
Jung et al.

(10) Patent No.: US 12,810,134 B2
(45) Date of Patent: Nov. 24, 2026

(54) APPARATUS AND METHOD WITH MULTIPLE NEURAL PROCESSING UNITS FOR NEURAL NETWORK OPERATION

(71) Applicants: SAMSUNG ELECTRONICS CO., LTD., Suwon-si (KR); Seoul National University R&DB Foundation, Seoul (KR)

(72) Inventors: Hanwoong Jung, Suwon-si (KR); Soonhoi Ha, Seoul (KR); Keonjoo Lee, Suwon-si (KR); Changjae Yi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 594 days.

(21) Appl. No.: 18/360,160

(22) Filed: Jul. 27, 2023

(65) Prior Publication Data

US 2024/0211744 A1 Jun. 27, 2024

(30) Foreign Application Priority Data

Dec. 22, 2022 (KR) ........................ 10-2022-0182128

(51) Int. Cl.
*G06N 3/065* (2023.01)
*G06F 15/80* (2006.01)

(52) U.S. Cl.
CPC ............. *G06N 3/065* (2023.01); *G06F 15/80* (2013.01)

(58) Field of Classification Search
CPC ............ G06N 3/065; G06N 3/02; G06N 3/04; G06N 3/0464; G06N 3/0475; G06N 3/0495; G06N 3/0499; G06F 15/80
See application file for complete search history.

(56) References Cited

U.S. PATENT DOCUMENTS 5,640,586 A 6/1997 Pechanek et al.
10,922,258 B2 2/2021 Han et al.
(Continued)

FOREIGN PATENT DOCUMENTS

KR 10-2017-0032547 A 3/2017
KR 10-2021-0075007 A 6/2021
(Continued)

OTHER PUBLICATIONS

Korean Office Action issued on May 28, 2026, in counterpart Korean Patent Application No. 10-2022-0182128 (3 pages in English, 6 pages in Korean).

*Primary Examiner* — Edward Zee
(74) *Attorney, Agent, or Firm* — NSIP Law

(57) ABSTRACT

An apparatus includes: memories storing data to perform a neural network operation; processors to generate a neural network operation result by performing a neural network operation by reading the data; and crossbars processing data transmission between the processors and the memories, wherein the crossbars include: a first crossbar of a first group processing data transmission between a first group of the processors and a first group of the memories, a second crossbar of a second group processing data transmission between a second group of the processors and a second group of the memories, wherein the first group of processors does not include any processors that are in the second group of processors and wherein the first group of memories does not include any memories that are in the second group of memories, and a third crossbar connecting the first crossbar to the second crossbar.

17 Claims, 12 Drawing Sheets

(56) References Cited

U.S. PATENT DOCUMENTS

| | | | | |
|---|---|---|---|---|
| 2014/0064269 | A1 | 3/2014 | Hamdi et al. | |
| 2022/0261650 | A1 * | 8/2022 | Zhao | G06N 3/084 |
| 2023/0236878 | A1 * | 7/2023 | Choquette | G06F 9/3009<br>718/106 |

FOREIGN PATENT DOCUMENTS

| | | | |
|---|---|---|---|
| KR | 10-2021-0135998 | A | 11/2021 |
| KR | 10-2022-0033329 | A | 3/2022 |

* cited by examiner

FIG. 5

| Map | SPM 0 | SPM 1 | SPM 2 | SPM 3 | SPM 4 | SPM 5 | SPM 6 | SPM 7 | SPM 8 | SPM 9 | SPM 10 | SPM 11 | SPM 12 | SPM 13 | SPM 14 | SPM 15 |
|---|---|---|---|---|---|---|---|---|---|---|---|---|---|---|---|---|
| NPU 0 | O | O | O | O | O | | | | | | | | | | | |
| NPU 1 | O | O | O | O | O | | | | | | | | | | | |
| NPU 2 | O | O | O | O | O | | | | | | | | | | | |
| NPU 3 | O | O | O | O | O | O | O | O | O | | | | | | | |
| NPU 4 | O | O | O | O | O | O | O | O | O | | | | | | | |
| NPU 5 | | | | O | O | O | O | O | O | | | | | | | |
| NPU 6 | | | | O | O | O | O | O | O | | | | | | | |
| NPU 7 | | | | O | O | O | O | O | O | O | O | O | O | | | |
| NPU 8 | | | | O | O | O | O | O | O | O | O | O | O | | | |
| NPU 9 | | | | | | | | O | O | O | O | O | O | | | |
| NPU 10 | | | | | | | | O | O | O | O | O | O | | | |
| NPU 11 | | | | | | | | O | O | O | O | O | O | O | O | O |
| NPU 12 | | | | | | | | O | O | O | O | O | O | O | O | O |
| NPU 13 | | | | | | | | | | | | O | O | O | O | O |
| NPU 14 | | | | | | | | | | | | O | O | O | O | O |
| NPU 15 | | | | | | | | | | | | O | O | O | O | O |

APPARATUS AND METHOD WITH MULTIPLE NEURAL PROCESSING UNITS FOR NEURAL NETWORK OPERATION

CROSS-REFERENCE TO RELATED APPLICATIONS

This application claims the benefit under 35 USC § 119(a) of Korean Patent Application No. 10-2022-0182128, filed on Dec. 22, 2022, in the Korean Intellectual Property Office, the entire disclosure of which is incorporated herein by reference for all purposes.

BACKGROUND

1. Field

The following description relates to a method and apparatus with multiple neural processing units (NPUs) for neural network operation.

2. Description of Related Art

There is an increasing need for simultaneously performing a large-scale deep learning network and various deep learning applications. The demand for multi-neural processing unit (NPU) systems for performing deep learning applications has increased. Due to characteristics of multi-NPU systems, scratchpad memory (SPM) may be used instead of cache memory because a performing order is determined at compile time. SPM may be used in a multi-NPU system, however, effective connection between an NPU to SPM is lacking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation apparatus includes: memories storing data to perform a neural network operation; processors configured to generate a neural network operation result by performing a neural network operation by reading the data; and crossbars processing data transmission between the processors and the memories, wherein the crossbars include: a first crossbar of a first group processing data transmission between a first group of the processors and a first group of the memories in the first group, a second crossbar of a second group processing data transmission between a second group of the processors and a second group of the memories in the second group, wherein the first group of processors does not include any processors that are in the second group of processors and wherein the first group of memories does not include any memories that are in the second group of memories, and a third crossbar connecting the first crossbar to the second crossbar.

The number of processors may be the same as the number of memories.

The first crossbar may be fully connected to the first processors and the first memories included in the first group, and the second crossbar may be fully connected to the second processors and the second memories in the second group.

The third crossbar may connect a first processor in the first group to a second processor in the second group.

The crossbars may further include a fourth crossbar connecting the first crossbar to the second crossbar, and the fourth crossbar may connect a first memory in the first group to a second memory in the second group.

A first processor in the first group may be configured to: read some of the data from the first memory in the first group through the first crossbar, and write some of the neural network operation result into the second memory in the second group through the third crossbar, the second crossbar, and the fourth crossbar.

A second processor in the second group may be configured to: read some of the data from the first memory in the first group through the fourth crossbar, the second crossbar, and the third crossbar, and read data that may be different from the data from the second memory in the second group through the second crossbar and the third crossbar.

In one general aspect, a neural network operation apparatus includes: memories storing data to perform a neural network operation; processors configured to generate a neural network operation result by performing a neural network operation by reading the data; and crossbars processing data transmission between the processors and the memories, wherein the crossbars include: a first crossbar processing data transmission between a first group of the processors and a first group of the memories in a first group, a second crossbar processing data transmission between a second group of the processors and a second group of the memories in a second group, wherein the first group of processors does not include any processors that are in the second group of processors and wherein the first group of memories does not include any memories that are in the second group of memories, and a third crossbar connecting the first crossbar to the second crossbar, wherein a portion of the processors are each directly connected to the third crossbar.

The portion of the processors may be different from a processor included in the first group or a processor included in the second group.

The crossbars may further include a fourth crossbar connecting the first crossbar to the second crossbar, and a portion of the plurality of memories may be directly connected to the fourth crossbar.

The portion of the memories may be different from a memory included in the first group or a memory included in the second group.

The number of processors may be the same as the number of memories.

The first crossbar may be fully connected to the processors and the memories in the first group, and the second crossbar may be fully connected to the processors and the memories in the second group.

The third crossbar may connects a first processor in the first group to a second processor in the second group.

The portion of the processors may be configured to: read some of the data from a first memory in the first group through the third crossbar and the first crossbar, and write some of the neural network operation result into a second memory in the second group through the third crossbar and the second crossbar.

The portion of the processors may be further configured to: read some of the data from a first memory in the first group through the third crossbar and the first crossbar, and write some of the neural network operation result in the portion of the memories through the third crossbar and the second crossbar.

In one general aspect, a neural network operation method includes: reading data to perform a neural network operation from memories through at least one crossbar; generating a neural network operation result by performing a neural network operation using the data through processors; and writing the neural network operation result in the memories through crossbars, wherein the crossbars include: a first crossbar processing data transmission between a first group of the processors and a second group of the memories in a first group, a second crossbar processing data transmission between a second group of the processors and a second group of the memories, wherein the first group of processors does not include any processors that are in the second group of processors and wherein the first group of memories does not include any memories that are in the second group of memories, and a third crossbar connecting the first crossbar to the second crossbar.

The third crossbar may connect a first processor in the first group to a second processor in the second group.

The writing of the neural network operation result includes writing some of the neural network operation result through the third crossbar, the second crossbar, and a fourth crossbar that connects a first memory in the first group to a second memory in the second group.

The reading of the some of the data may include reading the data from the first memory through the fourth crossbar, the second crossbar, and the third crossbar.

Other features and aspects will be apparent from the following detailed description, the drawings, and the claims.

BRIEF DESCRIPTION OF THE DRAWINGS

FIG. 5 illustrates an example access range of a neural network operation apparatus to a processor and a memory, according to one or more example embodiments.

Figure 1:
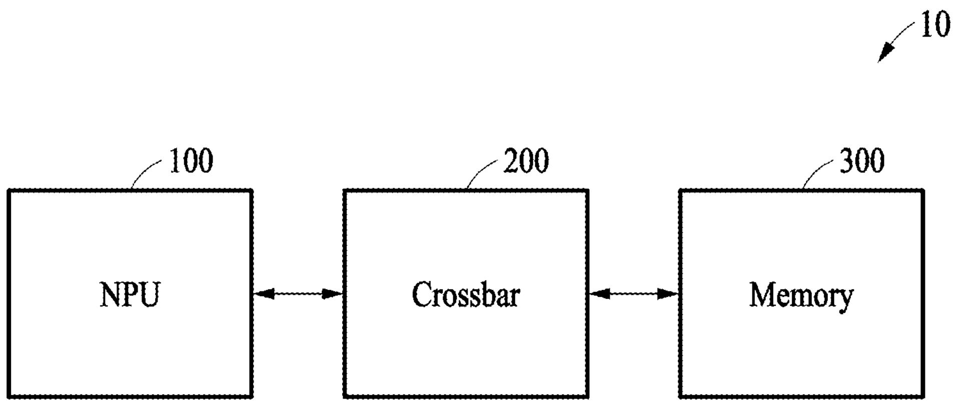
FIG. 1 illustrates an example neural network operation apparatus according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example neural network operation apparatus, according to one or more example embodiments.

Referring to FIG. 1, a neural network operation apparatus 10 may perform a neural network operation. The neural network operation apparatus 10 may provide various topologies of a crossbar 200 in a system that requires a plurality of processors 100 and a plurality of memories 300.

A neural network may be a general model that has the ability to solve a problem and where nodes forming the neural network through synaptic combinations change a connection strength through training.

The nodes of the neural network may include a combination of weights or biases. The neural network may include one or more layers each including one or more nodes. The neural network may infer or predict a desired result from an input by changing the weights of the nodes through training.

The neural network may include a deep neural network (DNN). The neural network may include a convolutional neural network (CNN), a recurrent neural network (RNN), a perceptron, a multilayer perceptron, a feed forward (FF) network, a radial basis network (RBF), a deep feed forward (DFF) network, a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a binarized neural network (BNN), and an attention network (AN).

The neural network operation apparatus 10 may be implemented in a personal computer (PC), a data server, or a portable device.

A portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

The neural network operation apparatus 10 may include a processor 100, a crossbar 200, and a memory 300.

The processor 100 may process data stored in the memory 300. The processor 100 may execute computer-readable code (e.g., software in the form of instructions) stored in the memory 300 and instructions triggered by the processor 100.

The processor 100 may be a data processing device implemented by hardware including a circuit having a physical structure to perform desired operations. For example, the desired operations may include code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 100 may include an accelerator. The accelerator may include a neural processing unit (NPU), a graphics processing unit (GPU), an FPGA, an ASIC, or an application processor (AP). Alternatively, the accelerator may be implemented as a software computing environment, such as a virtual machine or container.

The processor 100 may read data stored in the memory 300. The processor 100 may generate a neural network operation result by reading data and performing a neural network operation. A plurality of processors 100 may be provided.

The crossbar 200 may connect the processor 100 to the memory 300. The neural network operation apparatus 10 may include a crossbar 200 (or more than one; description of the singular extends to the plural). The crossbar 200 may transmit data between the plurality of processors 100 and the plurality of memories 300. The number of processors 100 may be the same as the number of memories 300. Depending on implementation, the number of processors 100 may be different from the number of memories 300.

The crossbar 200 may include a first crossbar, a second crossbar, a third crossbar, and a fourth crossbar. The first crossbar may process data transmission among processors of a first group (of the processors 100) and memories (of the memories 300) of the first group.

The first crossbar may be fully connected to the processors and the memories included in the first group.

The second crossbar may process data transmission among processors of a second group and memories of the second group that are included among the plurality of processors 100 and the plurality of memories 300, and the second group is different from the first group. The second crossbar may be fully connected to the processors and the memories included in the second group.

The third crossbar may connect the first crossbar to the second crossbar. The third crossbar may connect a first processor included in the first group to a second processor included in the second group.

The fourth crossbar may connect the first crossbar to the second crossbar. The fourth crossbar may connect a first memory included in the first group to a second memory included in the second group.

A first processor included in the first group may read data from the first memory included in the first group through the first crossbar. The first processor may write a neural network operation result in the second memory included in the second group through the third crossbar, the second crossbar, and the fourth crossbar.

A second processor included in the second group may read data from the first memory included in the first group through the fourth crossbar, the second crossbar, and the third crossbar. The second processor may read data (e.g., different from the data read from the first memory) from the second memory included in the second group through the second crossbar and the third crossbar.

The memory 300 stores instructions (or programs) executable by the processor 100. For example, the instructions include instructions to perform an operation of the processor 100 and/or an operation of each element of the processor 100.

The memory 300 may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, or insulator resistance change memory. A plurality of memories 300 may be provided. For example, the memory 300 may include scratch pad memory (SPM).

The memory 300 may store data to perform a neural network operation. The data for the neural network operation may include model parameters (e.g., weights) of the neural network or operand data (e.g., input or intermediate data) of the neural network operation.

Figure 2:
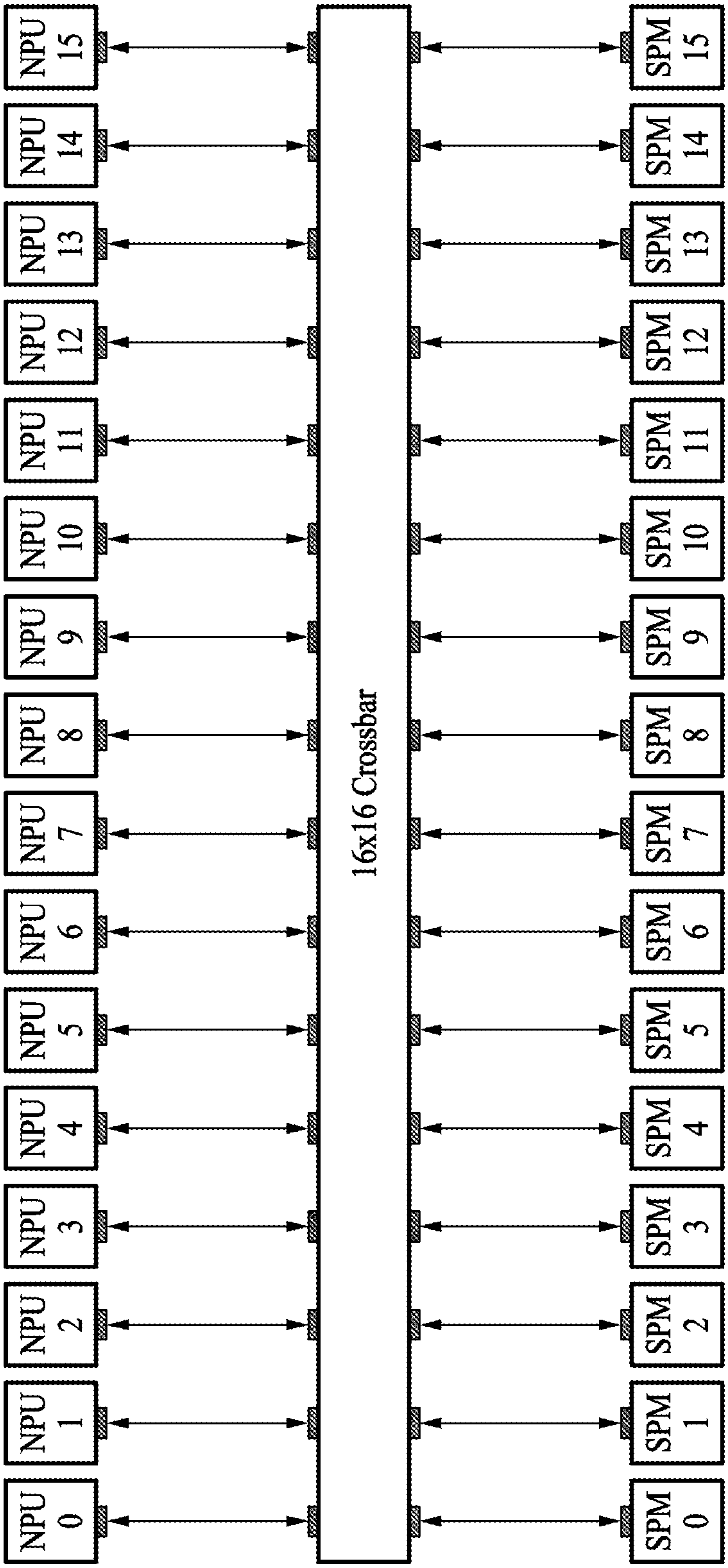
FIG. 2 illustrates an example implementation of a neural network operation apparatus, according to one or more example embodiments.

FIG. 2 illustrates an example implementation of a neural network operation apparatus, according to one or more example embodiments.

In the example of FIG. 2, a processor (e.g., the processor 100 of FIG. 1) is an NPU and memory (e.g., the memory 300 of FIG. 1) is SPM.

A multi-NPU system may include a plurality of NPUs and a plurality of SPMs. An example multi-NPU system as shown in FIG. 2 may include 16 NPUs that are fully connected to 16 SPMs using a 16×16 crossbar. In the case of a system with an architecture like that of the example of FIG. 2 (i.e., full crossbar connectivity between each NPU and each SPM), as the number of NPUs and the number of SPMs increase, hardware complexity may increase, the multi-NPU system may not be scalable, and leakage power may increase.

Figure 3:
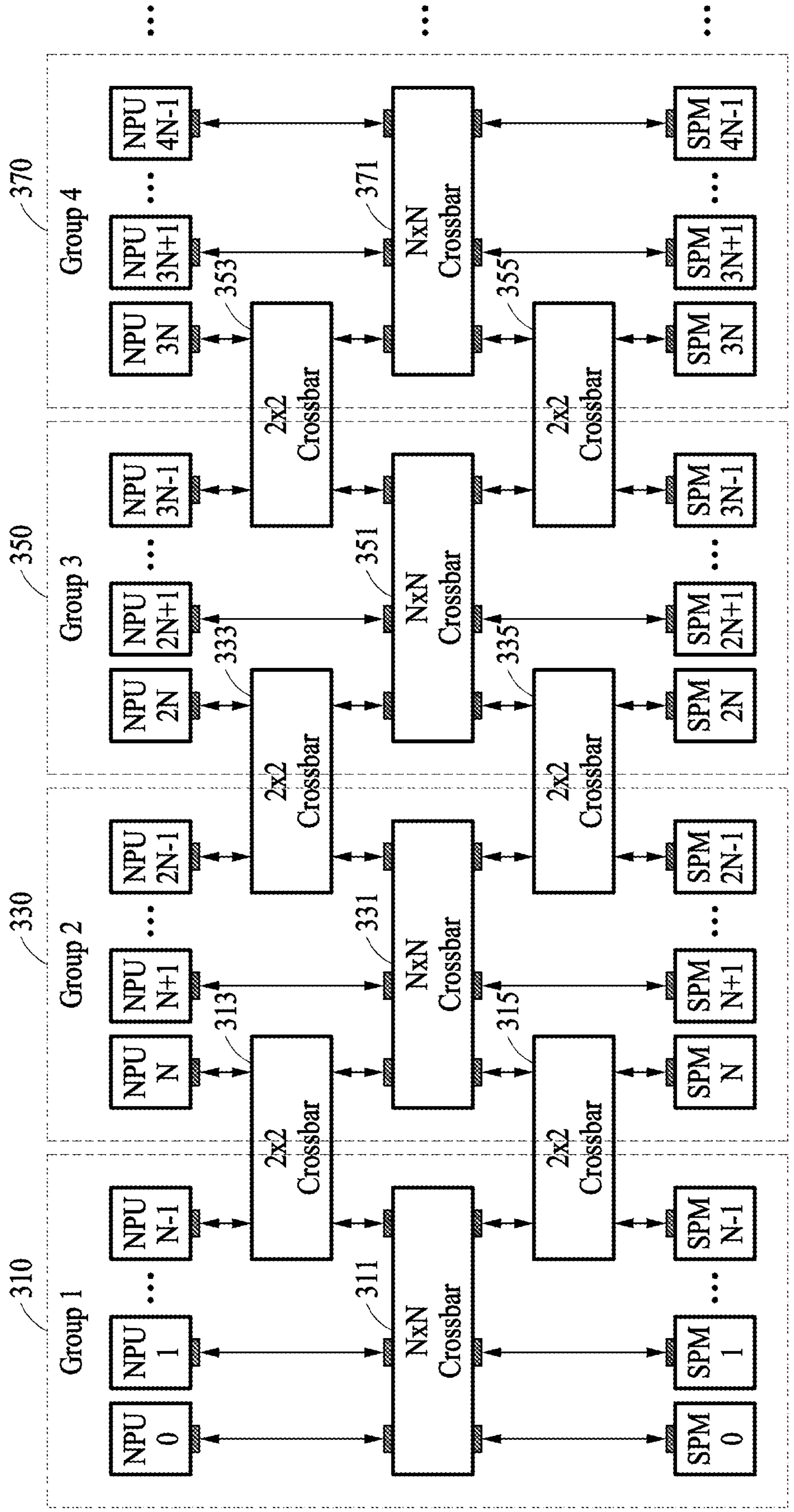
FIG. 3 illustrates an example implementation of the neural network operation apparatus, according to one or more example embodiments.

FIG. 3 illustrates an example implementation of the neural network operation apparatus, according to one or more example embodiments.

The example of FIG. 3 includes a processor (e.g., the processor 100 of FIG. 1) that is an NPU and memory (e.g., the memory 300 of FIG. 1) that is SPM. The example system of FIG. 3 is structured as a multi-NPU system in which the number of NPUs corresponds to the number of SPMs outside the NPUs.

When using a fully-connected crossbar that directly connects each NPUs to each SPM in an environment having multiple NPUs and SPMs (or SPM banks), hardware complexity of the crossbar may be excessively high, and thus, hardware performance and cost may be affected.

The neural network operation apparatus 10 provides a scalable multi-crossbar topology. The neural network operation apparatus 10 may form NPUs and SPMs into units of groups and may provide connectivity for all NPUs and SPMs in a group using a crossbar. As shown in FIG. 3, the neural network operation apparatus 10 may process data movement between groups by connecting the crossbars of neighboring groups using two 2×2 crossbars.

In the example of FIG. 3, a first group 310 may include N NPUs and N SPMs and an N×N crossbar 311 (e.g., a first crossbar) may fully connect (directly, or indirectly via the 2×2 crossbars 313, 315) the N NPUs to the N SPMs.

A second group 330 may also include N NPUs and N SPMs and an N×N crossbar 331 may also fully connect (directly, or indirectly via the 2×2 crossbars 313, 315) the N NPUs to the N SPMs. As noted, the first group 310 may be connected to the second group 330 through two 2×2 crossbars 313 and 315.

The 2×2 crossbar 313 may be connected to a processor of the first group 310 and a processor of the second group 330. The 2×2 crossbar 315 may be connected to an SPM of the first group and an SPM of the second group.

The third group 350 may include N NPUs and N SPMs and an N×N crossbar 351 may fully connect the N NPUs to the N SPMs. A 2×2 crossbar 333 may be connected to a processor of the second group 330 and a processor of the third group 350. A 2×2 crossbar 335 may be connected to an SPM of the second group 330 and an SPM of the third group 350.

The fourth group 370 may include N NPUs and N SPMs and an N×N crossbar 371 may fully connect the N NPUs to the N SPMs. A 2×2 crossbar 353 may be connected to a processor of the third group 350 and a processor of the fourth group 370. A 2×2 crossbar 355 may be connected to an SPM of the third group 350 and an SPM of the fourth group 370.

Through the structure of FIG. 3, the neural network operation apparatus 10 may have low hardware complexity and scalability. The neural network operation apparatus 10 may efficiently perform a neural network operation without performance degradation and memory contention.

When performing a deep learning application, the neural network operation apparatus 10 may determine a memory address that is mapped onto (and used in) a compiler end using an SPM. Through this, the neural network operation apparatus 10 may reduce memory contention compared to a system with one fully-connected crossbar and may provide a scalable system without significant degradation of performance.

The neural network operation apparatus 10 may allocate a wider range (compared to other devices) to be accessed (or to access) a predetermined NPU and a predetermined SPM, which are connected to a 2×2 crossbar that connects groups. The neural network operation apparatus 10 may allocate a limited access range for an NPU or an SPM, which is not connected to the 2×2 crossbar. Here, an access range is a range of SPMs a given NPU can access or a range of NPUs that an SPM can access.

The neural network operation apparatus 10 may use an NPU or an SPM having a wide access range to store data that needs to be shared or to access an SPM included in another group. For other accesses, the neural network operation apparatus 10 may process using an NPU and an SPM in the same group. Through this, the neural network operation apparatus 10 may decrease hardware complexity compared to a fully-connected crossbar, may decrease an area occupied by crossbar circuitry, and may reduce leakage power.

Figure 4:
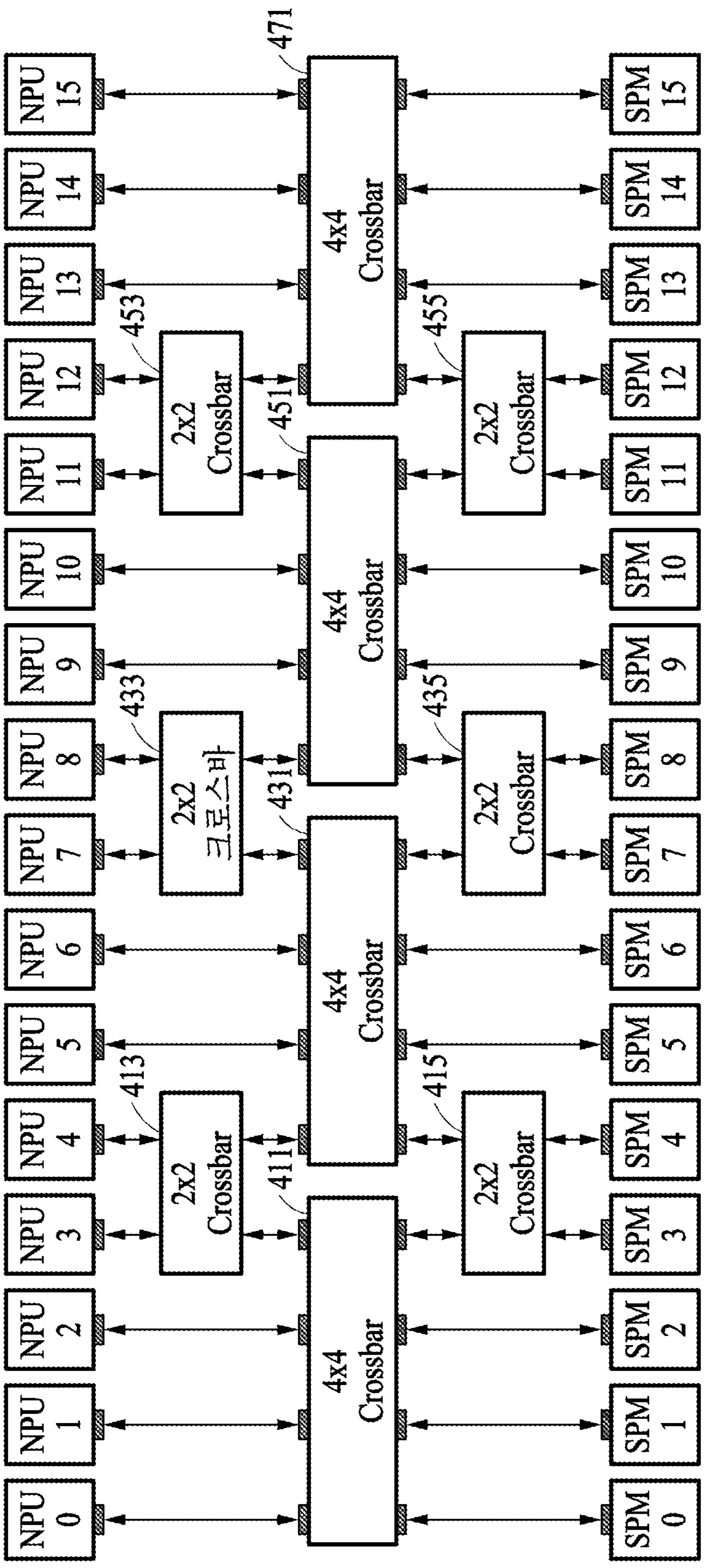
FIG. 4 illustrates an example of implementation of the neural network operation apparatus, according to one or more example embodiments.

FIG. 4 illustrates an example implementation of the neural network operation apparatus according to one or more example embodiments, and FIG. 5 illustrates an example of access ranges (of the neural network operation apparatus of FIG. 4) of SPMs and NPUs, according to one or more example embodiments.

The example system of FIG. 4 may include 16 NPUs connected to 16 SPMs using four 4×4 crossbars 411, 431, 451, and 471 and six 2×2 crossbars 413, 415, 433, 435, 453, and 455. The example of FIG. 4 is an implementation of the general example of FIG. 3 in which 4 processors and 4 memories are included in each of 4 groups.

The hardware complexity of the example of FIG. 2 may be compared to the hardware complexity of the example of FIG. 4. When hardware complexity of a 4×4 crossbar is C, hardware complexity of a 16×16 crossbar may be 8C, because the 16×16 crossbar has the same complexity as eight 4×4 crossbars.

Hardware complexity of four 2×2 crossbars may be the same as one 4×4 crossbar. Accordingly, hardware complexity of six 2×2 crossbars may be 1.5C. Accordingly, the over crossbar hardware complexity of the example of FIG. 4 may be 5.5C, which is less than the 8C complexity of the 16×16 crossbar even though the same number of NPUs and SPMs are interconnected. In other words, through the structure shown in FIG. 5, the neural network operation apparatus 10 may decrease an area occupied by crossbar hardware and reduce leakage power.

The diagram of FIG. 5 represents access ranges of NPUs and SPMs in the structure of FIG. 4. An access range of an NPU and an SPM connected to a 2×2 crossbar may be wider than access ranges of other NPUs and SPMs. Specifically, NPUs 3, 4, 7, 8, 11, and 12 (which are connected to 2×2 crossbars) may have an access range that includes an SPM of a neighboring group.

When performing a neural network layer operation, for example, requiring an access to an SPM outside of a given group, an NPU in the given connected to a 2×2 crossbar may perform the layer operation.

SPMs 3, 4, 7, 8, 11, and 12 connected to the 2×2 crossbars may be accessible by an NPU of a neighboring group. Data shared through two or more NPUs may be used by writing data in an SPM connected to a 2×2 crossbar. In other words, group-border SPMs may be used as temporary storage for data transiting between groups.

Figure 6:
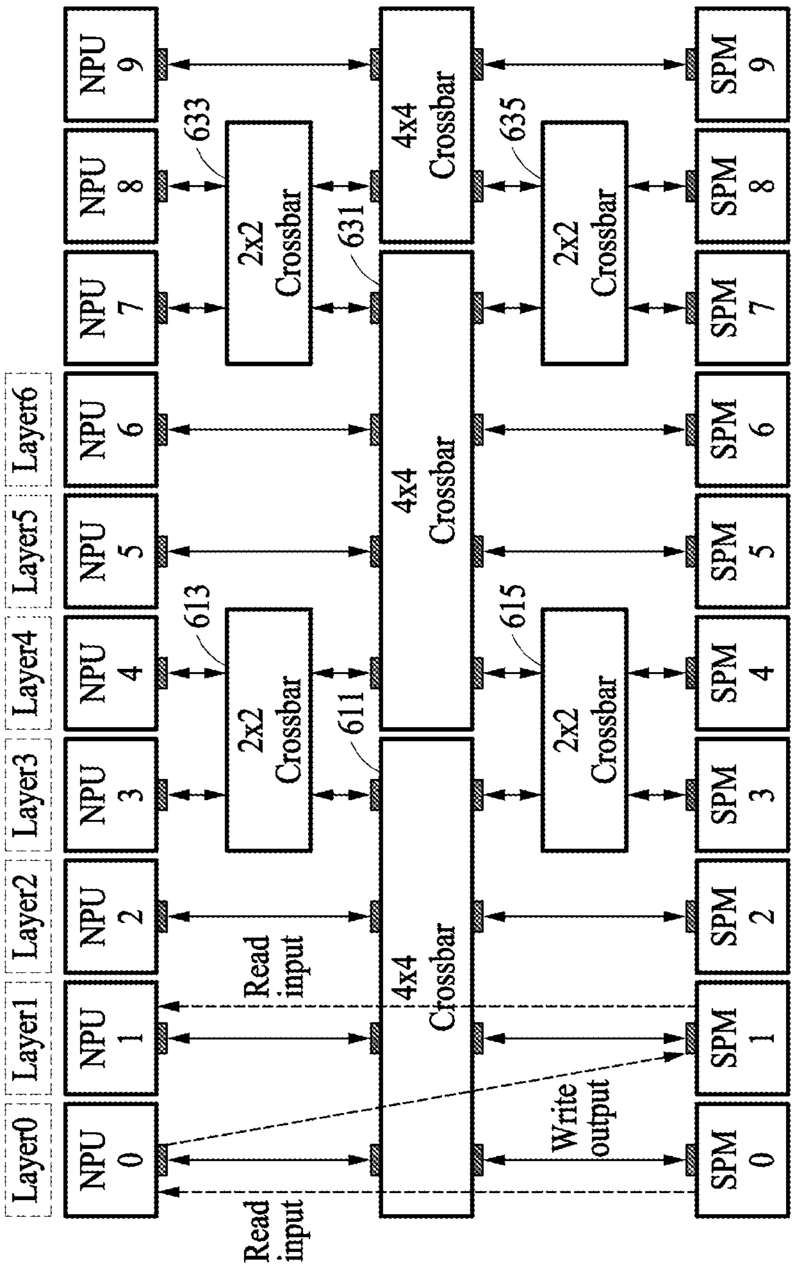
FIG. 6 illustrates an example of inter-layer pipelining, according to one or more example embodiments.
Figure 7:
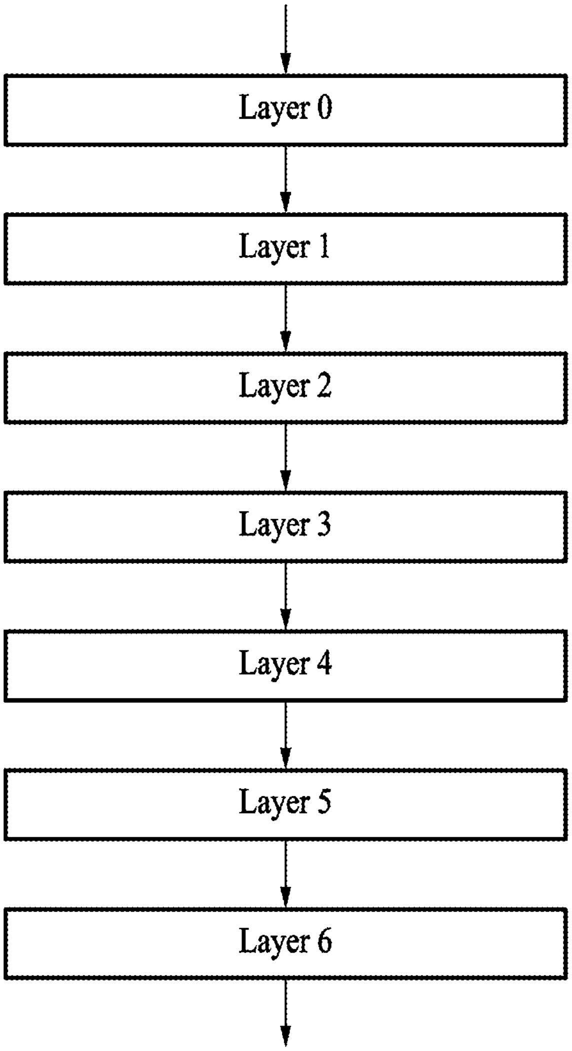
FIG. 7 illustrates an example of a neural network model, according to one or more example embodiments.

FIG. 6 illustrates an example of inter-layer pipelining for a neural network operation, and FIG. 7 illustrates an example of a neural network model being processed in FIG. 6.

Referring to FIGS. 6 and 7, the neural network operation apparatus 10 may perform a neural network operation by a single-network method or a multi-network method. The single-network method may include an inter-layer pipelining method, i.e., pipelining data between adjacent layers of the single neural network.

The example of FIG. 6 may have the same structure as the example of FIG. 4. A 2×2 crossbar 613 may connect an NPU3 to an NPU4 and a 2×2 crossbar 615 may connect an SPM3 to an SPM4. A 2×2 crossbar 633 may connect an NPU7 to an NPU8 and a 2×2 crossbar 635 may connect an SPM7 to an SPM8.

A 4×4 crossbar 611 may fully connect (directly or indirectly) each NPU of a first group to each SPM of the first group and a 4×4 crossbar 631 may fully connect (directly or indirectly) each NPU of a second group to each SPM of the second group.

By using the structure shown in FIG. 6, the neural network operation apparatus 10 may perform, for example, a CNN model having seven layers as shown in the example of FIG. 7 in the form of a pipeline. Each NPU may perform a neural network operation corresponding to one layer of the CNN and may write a result of its neural network operation to an SPM corresponding to an NPU that performs an operation of a subsequent layer, thus enabling the subsequent NPU to read its next target data.

Put another way, an NPU K may perform a neural network operation by reading input data stored in an SPM K and may store a neural network operation result in an SPM K+1. An NPU K+1 may perform a neural network operation of the subsequent layer based on the data stored in the SPM K+1.

When residual connection exists in a neural network, each NPU may perform pipelining by performing a neural network operation in units of residual blocks. Alternatively, compiling may be performed by performing an operation corresponding to a residual block in an NPU group and an SPM group connected to a 4×4 crossbar and transmitting a result of the operation corresponding to the residual block to a subsequent group through a 2×2 crossbar. The neural network operation apparatus 10 may perform various types of neural network operations by mapping memory usage during compiling.

Figure 8:
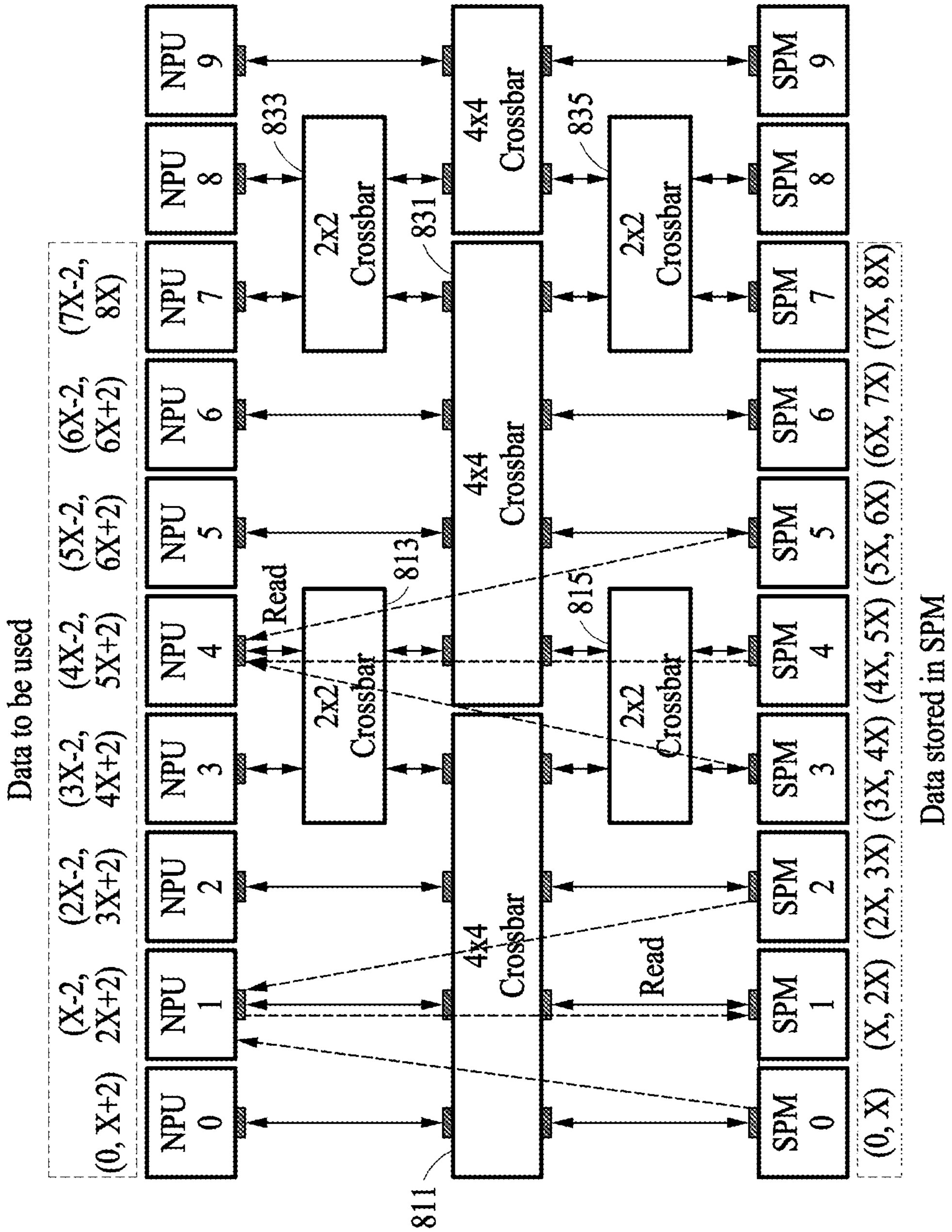
FIG. 8 illustrates an example of data partitioning, according to one or more example embodiments.
Figure 9:
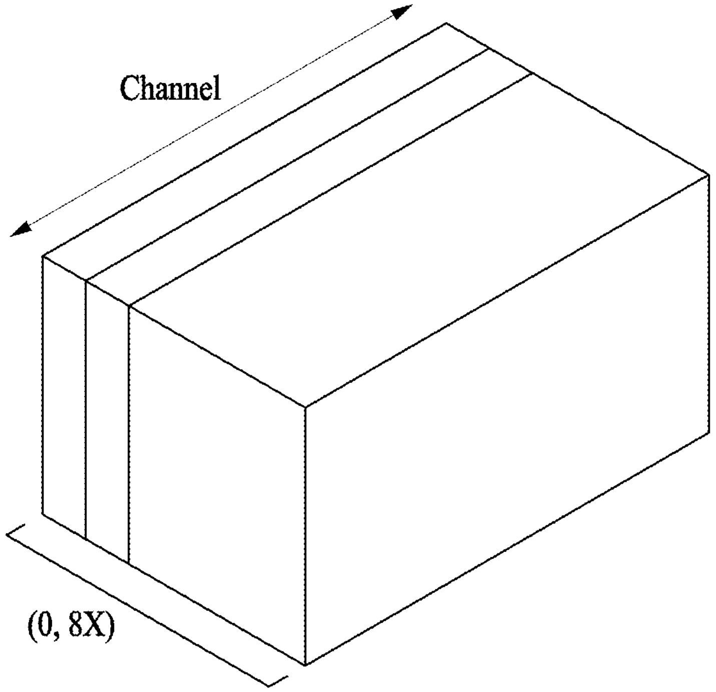
FIG. 9 illustrates an example of input data processed, according to one or more example embodiments.

FIG. 8 illustrates an example of data partitioning, and FIG. 9 illustrates an example of input data processed in FIG. 8.

Referring to FIGS. 8 and 9, the neural network operation apparatus 10 may perform a neural network operation in a single-network method or a multi-network method. The single-network method may include a data partitioning method.

Using the structure of FIG. 8, the neural network operation apparatus 10 may perform a convolution operation by using the data partitioning method for an input feature map having a size of 8× in a width direction, as shown in the example of FIG. 9.

The example of FIG. 8 may represent the same structure as the example of FIG. 4. A 2×2 crossbar 813 may connect an NPU3 to an NPU4 and a 2×2 crossbar 815 may connect an SPM3 to an SPM4. A 2×2 crossbar 833 may connect an NPU7 to an NPU8 and a 2×2 crossbar 835 may connect an SPM7 to an SPM8.

A 4×4 crossbar 811 may fully connect (directly or indirectly) each NPU of a first group to each SPM of the first group and a 4×4 crossbar 831 may fully connect (directly or indirectly) an NPU of a second group to an SPM of the second group.

To process an input feature map of FIG. 9, the neural network operation apparatus 10 may use NPUs 0 to 7 and SPMs 0 to 7. Characters below an SPM indicate a range portion of the overall width of an input feature map stored in the SPM. Characters above an NPU may represent a range portion of data required for the NPU to perform a convolution operation.

For example, to perform a convolution operation, an NPU1 may read data of SPMs 0 to 2 and an NPU4 may read data of SPMs 3 to 5. In this case, the NPU4 may read data of the SPM3 (which is in a different group) by using the 2×2 crossbar 813 or the 2×2 crossbar 815 (or both).

By performing a neural network operation using the method described above, the neural network operation apparatus 10 may remove performance degradation and reduce memory contention compared to a case using a fully-connected crossbar.

Figure 10:
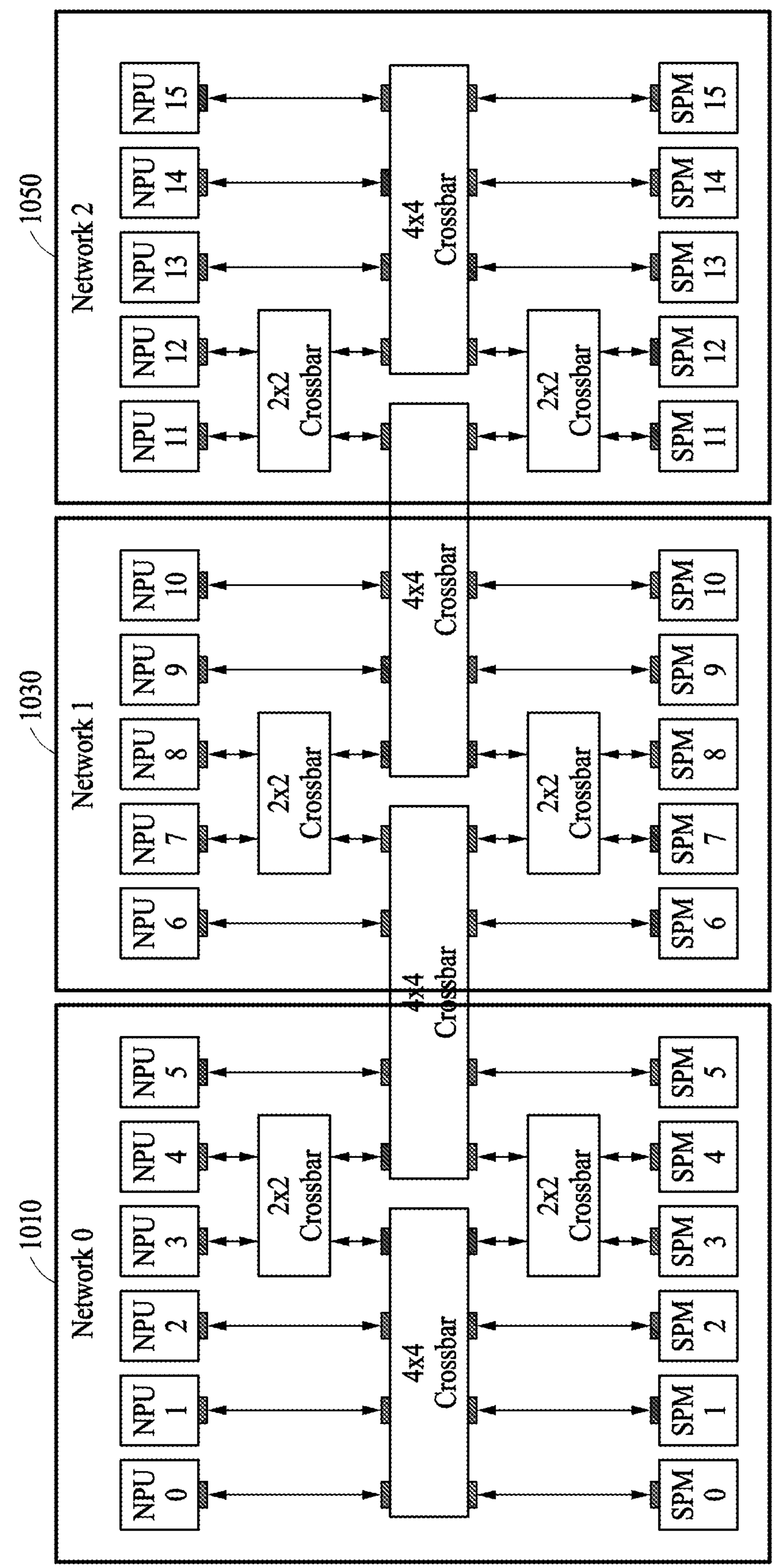
FIG. 10 illustrates an example operation of multiple networks of a neural network operation apparatus, according to one or more example embodiments.

FIG. 10 illustrates an example operation of multiple networks of a neural network operation apparatus, according to one or more example embodiments.

Referring to FIG. 10, the neural network operation apparatus 10 may perform a neural network operation in a single-network method or a multi-network method. The neural network operation apparatus 10 may perform a plurality of deep learning network applications using the multi-network method.

When the deep learning network applications are not dependent on each other and are independently performed, the neural network operation apparatus 10 may perform a neural network operation using the inter-layer pipelining method or the data partitioning method described above using a network 0 1010, a network 1 1030, and a network 2 1050.

Figure 11:
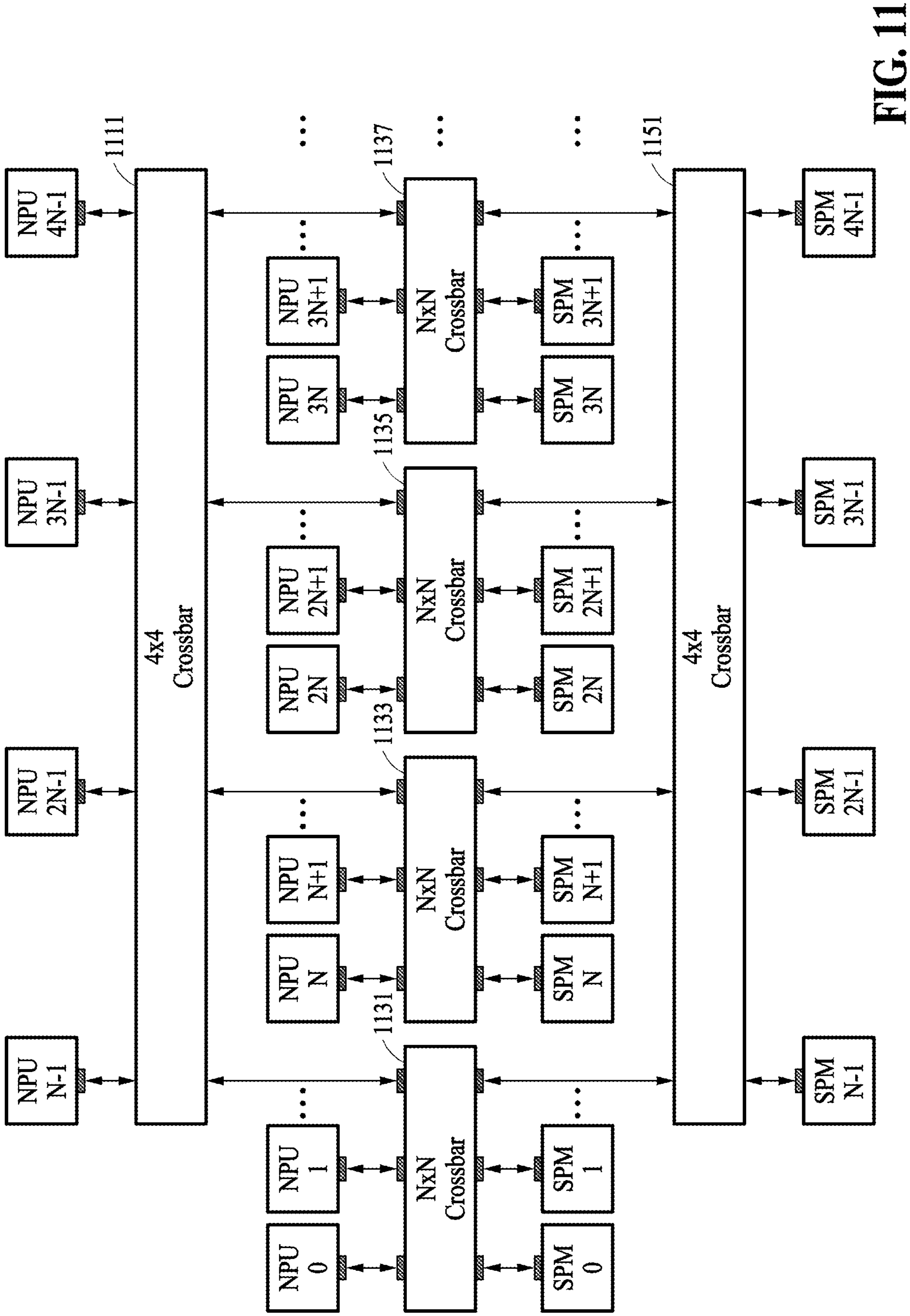
FIG. 11 illustrates an example implementation of the neural network operation apparatus, according to one or more example embodiments.

FIG. 11 illustrates an example of implementation of the neural network operation apparatus, according to one or more example embodiments.

Referring to FIG. 11, the neural network operation apparatus 10 may include a plurality of processors (e.g., NPUs) configured to generate a neural network operation result by performing a neural network operation by reading data and a plurality of memories (e.g., SPMs) storing the data to perform the neural network operation. The number of processors may be the same as the number of memories.

The neural network operation apparatus 10 may include crossbars processing data transmission between the plurality of processors and the plurality of memories.

The crossbars may include a first crossbar (e.g., an N×N crossbar 1131) processing data transmission between processors of a first group and memories of the first group constituted by some of the plurality of processors and some of the plurality of memories. The first crossbar may be fully connected to the processors and memories included in the first group.

The crossbars may also include a second crossbar (e.g., an N×N crossbar 1133) processing data transmission between processors of a second group and memories of the second group that is different from the first group and constituted by some of the plurality of processors and some of the plurality of memories. The second crossbar may be fully connected to the processors and the memories included in the second group.

The crossbars may also include a third crossbar (e.g., a 4×4 crossbar 1111) connecting the first crossbar to the second crossbar. Some processors (e.g., an NPU N-1, an NPU 2N-1, an NPU 3N-1, and an NPU4N-1) among the plurality of processors may be directly connected to the third crossbar. The third crossbar may connect a first processor included in the first group to a second processor included in the second group.

The crossbars may further include a fourth crossbar (e.g., a 4×4 crossbar 1151) connecting the first crossbar to the second crossbar. Some memories (e.g., an SPM N-1, an SPM 2N-1, an SPM 3N-1, and an SPM 4N-1) among the plurality of memories may be directly connected to the fourth crossbar.

Some memories may be memories different from memories included in the first group or the second group. Descriptions of an N×N crossbar 1135 and an N×N crossbar 1137 are omitted because the descriptions are generally the same as the descriptions of the N×N crossbar 1131 and the N×N crossbar 1133.

Some processors may be processors which are different from the processors included in the first group or the second group. Some processors may read data from a first memory included in the first group through the third crossbar and the first crossbar. Some processors may write a neural network operation result in the second memory included in the second group through the third crossbar and the second crossbar.

Some processors may read the data from the first memory included in the first group through the third crossbar and the first crossbar. Some processors may write a neural network operation result in some memories through the third crossbar and the fourth crossbar.

The neural network operation apparatus 10 may connect a plurality of groups of NPUs and SPMs using a 4×4 crossbar instead of a 2×2 crossbar. The structure of FIG. 11 may be advantageous in the case in which a large volume of data is shared among groups or in the case of an access to an application frequently occurs.

The example of FIG. 11 may have 16 NPUs and 16 SPMs. In this case, all NPUs may access SPMs 3, 7, 11, and 15 and NPUs 3, 7, 11, and 15 may access all SPMs. In the structure of FIG. 11, as the number of NPUs and SPMs increases, an area benefit may be great compared to a fully-connected crossbar.

Figure 12:
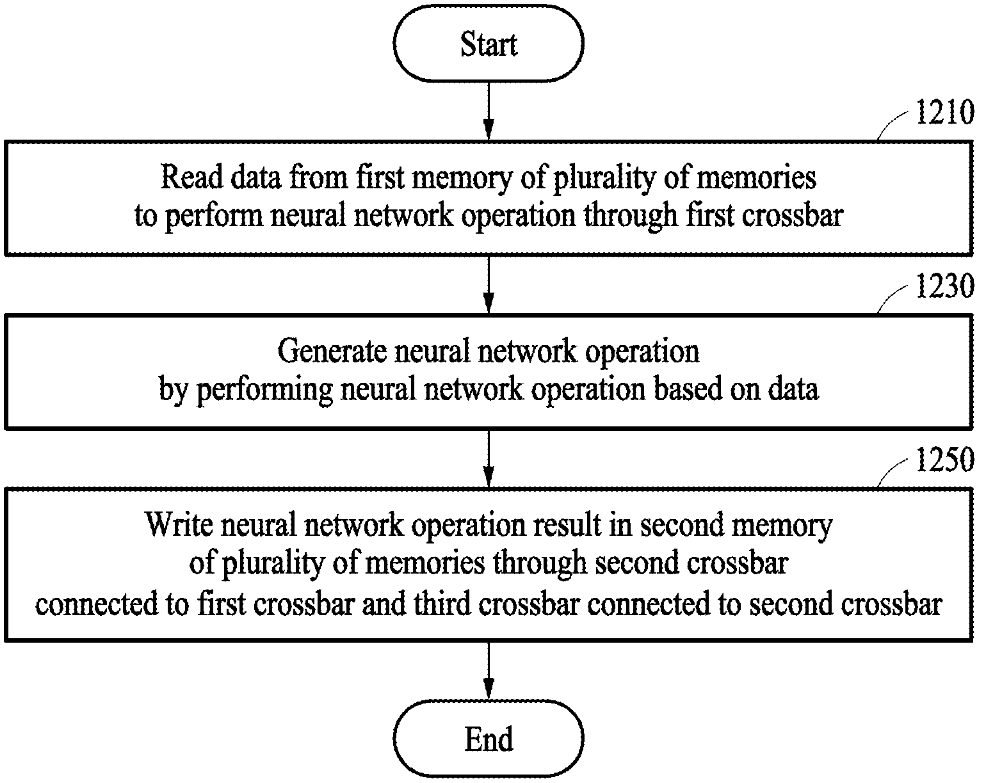
FIG. 12 illustrates an example operation of the neural network operation apparatus, according to one or more example embodiments.

FIG. 12 illustrates an example operation of the neural network operation apparatus of FIG. 1, according to one or more example embodiments.

Referring to FIG. 12, in operation 1210, the neural network operation apparatus 10 may read data from a plurality of memories to perform a neural network operation through crossbars.

In operation 1230, the neural network operation apparatus 10 may generate a neural network operation result by performing a neural network operation using data through a plurality of processors.

In operation 1250, the neural network operation apparatus 10 may write the neural network operation result in the plurality of memories through the crossbars.

The crossbars may include a first crossbar (e.g., an N×N crossbar 1131) processing data transmission between processors of a first group and memories of the first group constituted by some of the plurality of processors and some of the plurality of memories.

The crossbars may include a second crossbar processing data transmission between processors of a second group and memories of the second group that is different from the first group and constituted by some of the plurality of processors and some of the plurality of memories.

The at least one crossbar may include a third crossbar connecting the first crossbar to the second crossbar. The third crossbar may connect a first processor included in the first group to a second processor included in the second group.

The neural network operation apparatus 10 may write a neural network operation result through the third crossbar, the second crossbar, and a fourth crossbar that connects a first memory included in the first group to a second memory included in the second group.

The neural network operation apparatus 10 may read data from the first memory through the fourth crossbar, the second crossbar, and the third crossbar.

The computing apparatuses, the electronic devices, the processors, the memories, the information output system and hardware, the storage devices, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A neural network operation apparatus comprising:

memories storing data to perform a neural network operation;

processors configured to generate a neural network operation result by performing a neural network operation by reading the data; and crossbars processing data transmission between the processors and the memories, wherein the crossbars comprise:

a first crossbar of a first group processing data transmission between a first group of the processors and a first group of the memories in the first group, a second crossbar of a second group processing data transmission between a second group of the processors and a second group of the memories in the second group, wherein the first group of processors does not include any processors that are in the second group of processors and wherein the first group of memories does not include any memories that are in the second group of memories, and a third crossbar connecting the first crossbar to the second crossbar, and wherein the crossbars further comprise a fourth crossbar connecting the first crossbar to the second crossbar, and wherein the fourth crossbar connects a first memory in the first group to a second memory in the second group.

2. The neural network operation apparatus of claim 1, wherein the number of processors is the same as the number of memories.

3. The neural network operation apparatus of claim 1, wherein the first crossbar is fully connected to the first processors and the first memories comprised in the first group, and wherein the second crossbar is fully connected to the second processors and the second memories in the second group.

4. The neural network operation apparatus of claim 1, wherein the third crossbar connects a first processor in the first group to a second processor in the second group.

5. The neural network operation apparatus of claim 1, wherein a first processor in the first group is configured to:

read some of the data from the first memory in the first group through the first crossbar, and write some of the neural network operation result into the second memory in the second group through the third crossbar, the second crossbar, and the fourth crossbar.

6. The neural network operation apparatus of claim 1, wherein a second processor in the second group is configured to:

read some of the data from the first memory in the first group through the fourth crossbar, the second crossbar, and the third crossbar, and read data that is different from the data from the second memory in the second group through the second crossbar and the third crossbar.

7. A neural network operation apparatus comprising:

memories storing data to perform a neural network operation;

processors configured to generate a neural network operation result by performing a neural network operation by reading the data; and crossbars processing data transmission between the processors and the memories, wherein the crossbars comprise:

a first crossbar processing data transmission between a first group of the processors and a first group of the memories in a first group, a second crossbar processing data transmission between a second group of the processors and a second group of the memories in a second group, wherein the first group of processors does not include any processors that are in the second group of processors and wherein the first group of memories does not include any memories that are in the second group of memories, and a third crossbar connecting the first crossbar to the second crossbar, wherein a portion of the processors are each directly connected to the third crossbar, and wherein the crossbars further comprise a fourth crossbar connecting the first crossbar to the second crossbar, and wherein a portion of the plurality of memories is directly connected to the fourth crossbar.

8. The neural network operation apparatus of claim 7, wherein the portion of the processors is different from a processor comprised in the first group or a processor comprised in the second group.

9. The neural network operation apparatus of claim 7, wherein the portion of the memories is different from a memory comprised in the first group or a memory comprised in the second group.

10. The neural network operation apparatus of claim 7, wherein the number of processors is the same as the number of memories.

11. The neural network operation apparatus of claim 7, wherein the first crossbar is fully connected to the processors and the memories in the first group, and wherein the second crossbar is fully connected to the processors and the memories in the second group.

12. The neural network operation apparatus of claim 7, wherein the third crossbar connects a first processor in the first group to a second processor in the second group.

13. The neural network operation apparatus of claim 7, wherein the portion of the processors is configured to:

read some of the data from a first memory in the first group through the third crossbar and the first crossbar, and write some of the neural network operation result into a second memory in the second group through the third crossbar and the second crossbar.

14. The neural network operation apparatus of claim 7, wherein the portion of the processors is further configured to:

read some of the data from a first memory in the first group through the third crossbar and the first crossbar, and write some of the neural network operation result in the portion of the memories through the third crossbar and the second crossbar.

15. A neural network operation method comprising:

reading data to perform a neural network operation from memories through at least one crossbar;

generating a neural network operation result by performing a neural network operation using the data through processors; and writing the neural network operation result in the memories through crossbars, wherein the crossbars comprise:

a first crossbar processing data transmission between a first group of the processors and a first group of the memories in the first group, a second crossbar processing data transmission between a second group of the processors and a second group of the memories, wherein the first group of processors does not include any processors that are in the second group of processors and wherein the first group of memories does not include any memories that are in the second group of memories, and a third crossbar connecting the first crossbar to the second crossbar, and wherein the writing of the neural network operation result comprises writing some of the neural network operation result through the third crossbar, the second crossbar, and a fourth crossbar that connects a first memory in the first group to a second memory in the second group.

16. The neural network operation method of claim 15, wherein the third crossbar connects a first processor in the first group to a second processor in the second group.

17. The neural network operation method of claim 15, wherein the reading of the some of the data comprises reading the data from the first memory through the fourth crossbar, the second crossbar, and the third crossbar.

* * * * *